(12) United States Patent  (10) Patent No.: US 7,905,514 B2
Thomas  (45) Date of Patent: Mar. 15, 2011

(54) MOTOR VEHICLE SAFETY RESTRAINT SYSTEM

(75) Inventor: Scott D. Thomas, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 74 days.

(21) Appl. No.: 12/271,043

(22) Filed: Nov. 14, 2008

(65) Prior Publication Data

US 2010/0123301 A1  May 20, 2010

(51) Int. Cl.
*B60R 21/18* (2006.01)

(52) U.S. Cl. ............... 280/733; 280/730.2; 280/736; 280/801.1; 280/807

(58) Field of Classification Search .......... 280/730.2, 280/733, 736, 801.1, 807; *B60R 21/18*
See application file for complete search history.

(56) References Cited

U.S. PATENT DOCUMENTS

| | | | | |
|---|---|---|---|---|
| 3,908,928 A * | 9/1975 | Okada | ............ | 242/382 |
| 3,957,283 A * | 5/1976 | Pocobello | ............ | 297/475 |
| 4,645,234 A * | 2/1987 | Koide | ............ | 280/808 |
| 5,411,291 A | 5/1995 | Fohl | | |
| 5,450,723 A | 9/1995 | Fohl | | |
| 5,588,677 A | 12/1996 | Kopetzky et al. | | |
| 5,634,664 A * | 6/1997 | Seki et al. | ............ | 280/806 |
| 5,984,357 A | 11/1999 | Yasuda et al. | | |
| 6,010,151 A * | 1/2000 | Honda | ............ | 280/733 |
| 6,131,951 A | 10/2000 | Chicken et al. | | |
| 6,135,380 A | 10/2000 | Brown | | |
| 6,382,666 B1 * | 5/2002 | Devonport | ............ | 280/733 |
| 6,406,058 B1 * | 6/2002 | Devonport et al. | ............ | 280/733 |
| 6,565,121 B2 * | 5/2003 | Knych et al. | ............ | 280/806 |
| 6,708,380 B2 * | 3/2004 | Schneider et al. | ............ | 24/633 |
| 6,863,298 B2 | 3/2005 | Sakai et al. | | |
| 6,874,817 B2 | 4/2005 | Nakayama et al. | | |
| 6,877,776 B2 | 4/2005 | Ukita et al. | | |
| 7,168,742 B2 | 1/2007 | Tomita | | |
| 7,172,218 B2 | 2/2007 | Nakano et al. | | |
| 7,237,800 B2 | 7/2007 | Itoga | | |
| 7,607,687 B2 * | 10/2009 | Clute et al. | ............ | 280/733 |
| 2001/0011810 A1 * | 8/2001 | Saiguchi et al. | ............ | 280/728.1 |
| 2005/0057022 A1 * | 3/2005 | Birk et al. | ............ | 280/728.3 |
| 2005/0189752 A1 * | 9/2005 | Itoga et al. | ............ | 280/741 |

(Continued)

FOREIGN PATENT DOCUMENTS

EP  1253357 B1  12/2005

(Continued)

*Primary Examiner* — Paul N. Dickson
*Assistant Examiner* — Barry Gooden, Jr.
(74) *Attorney, Agent, or Firm* — Quinn Law Group, PLLC

(57) ABSTRACT

A safety restraint system for selectively restraining an occupant of a motorized vehicle is provided. The safety restraint system includes a safety belt webbing that is operatively mounted inside the vehicle passenger compartment, proximate to a seat assembly. An inflatable airbag cushion is engaged with a first end portion of the belt webbing. The cushion is configured to selectively transition from a non-expanded state, in which the cushion is in a stowed condition, to an expanded state, in which the cushion is in an inflated condition. An inflation device, operable to release inflation fluid, is in fluid communication with the cushion. Activation of the inflation device operates to transition the cushion from the non-expanded state to the expanded state. Transitioning of the cushion from the non-expanded state to the expanded state operates to retract a predetermined length of the belt webbing, thereby increasing the tension of the belt webbing.

16 Claims, 4 Drawing Sheets

U.S. PATENT DOCUMENTS

| | | | |
|---|---|---|---|
| 2006/0208124 A1* | 9/2006 | Clute | 242/374 |
| 2007/0102910 A1* | 5/2007 | Nezaki et al. | 280/733 |
| 2009/0066063 A1* | 3/2009 | Mical | 280/733 |
| 2009/0108570 A1* | 4/2009 | Itoga | 280/730.2 |
| 2009/0160167 A1* | 6/2009 | Itoga | 280/733 |
| 2009/0160168 A1* | 6/2009 | Itoga | 280/733 |
| 2009/0184503 A1* | 7/2009 | Itoga | 280/733 |
| 2009/0230662 A9* | 9/2009 | Itoga | 280/733 |
| 2009/0243262 A1* | 10/2009 | Itoga | 280/728.2 |
| 2009/0267332 A1* | 10/2009 | Clute | 280/733 |
| 2009/0273168 A1* | 11/2009 | McCormick | 280/736 |
| 2009/0322067 A1* | 12/2009 | Nezaki | 280/807 |

FOREIGN PATENT DOCUMENTS

| | | |
|---|---|---|
| EP | 1431134 B1 | 4/2006 |
| EP | 1513708 B1 | 12/2007 |
| GB | 2244203 A | 11/1991 |
| GB | 2375329 A | 11/2002 |

* cited by examiner

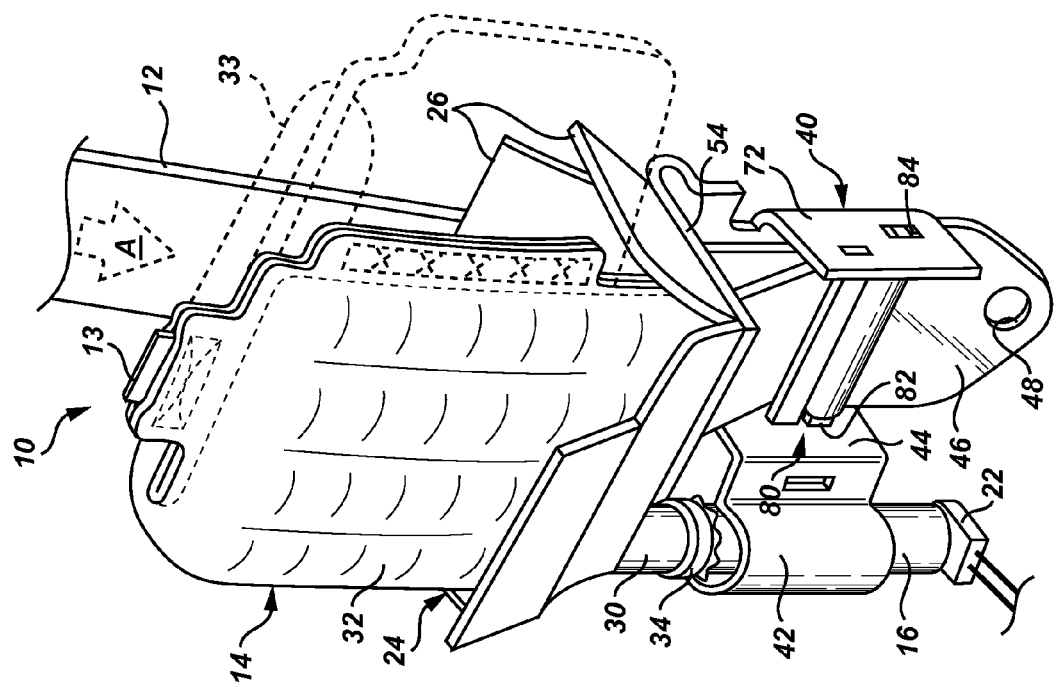
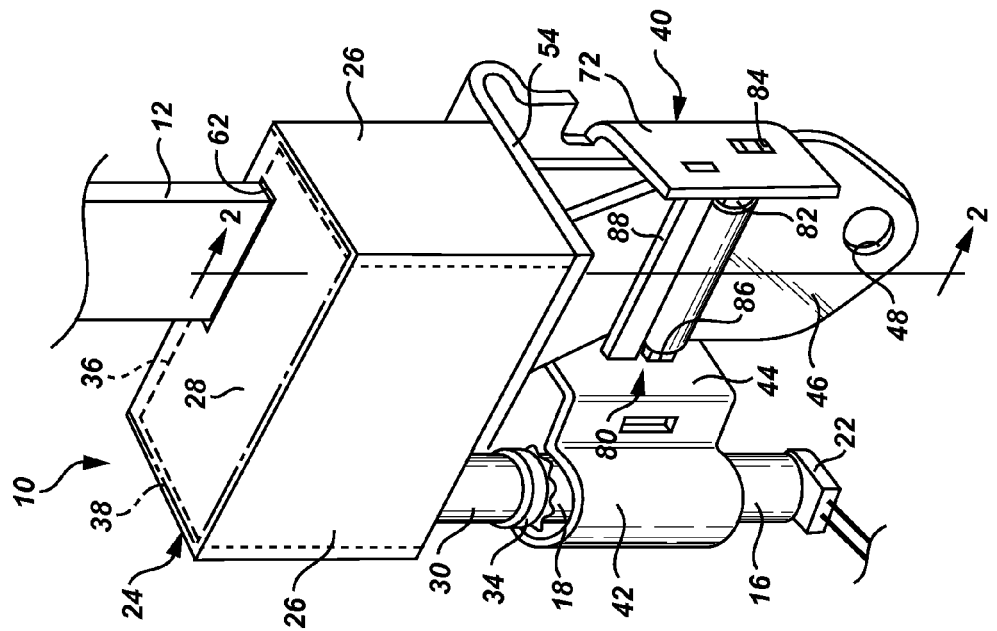
Fig. 1B
Fig. 1A

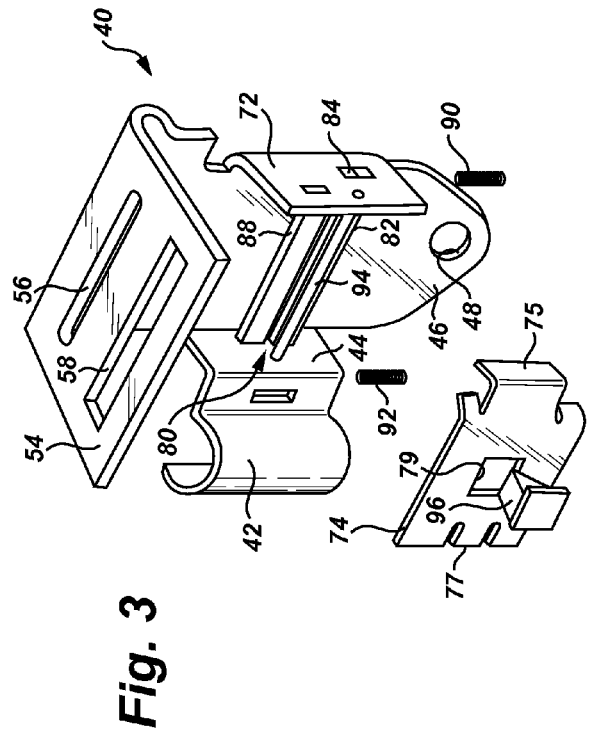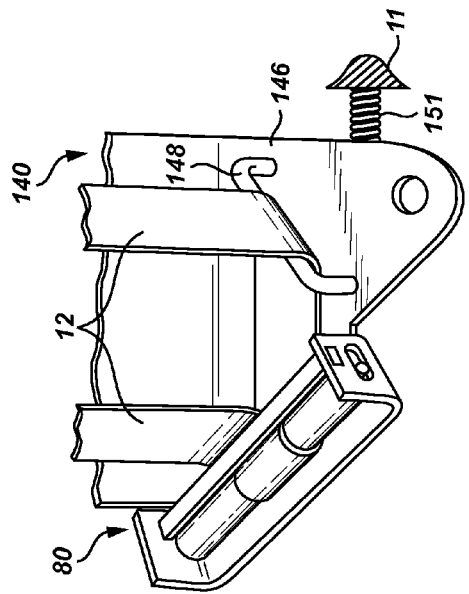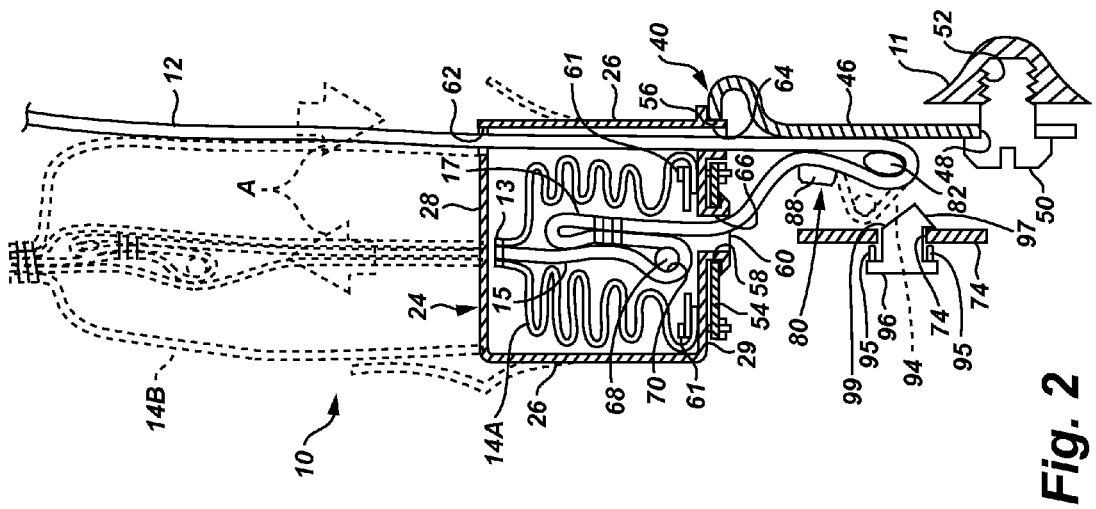

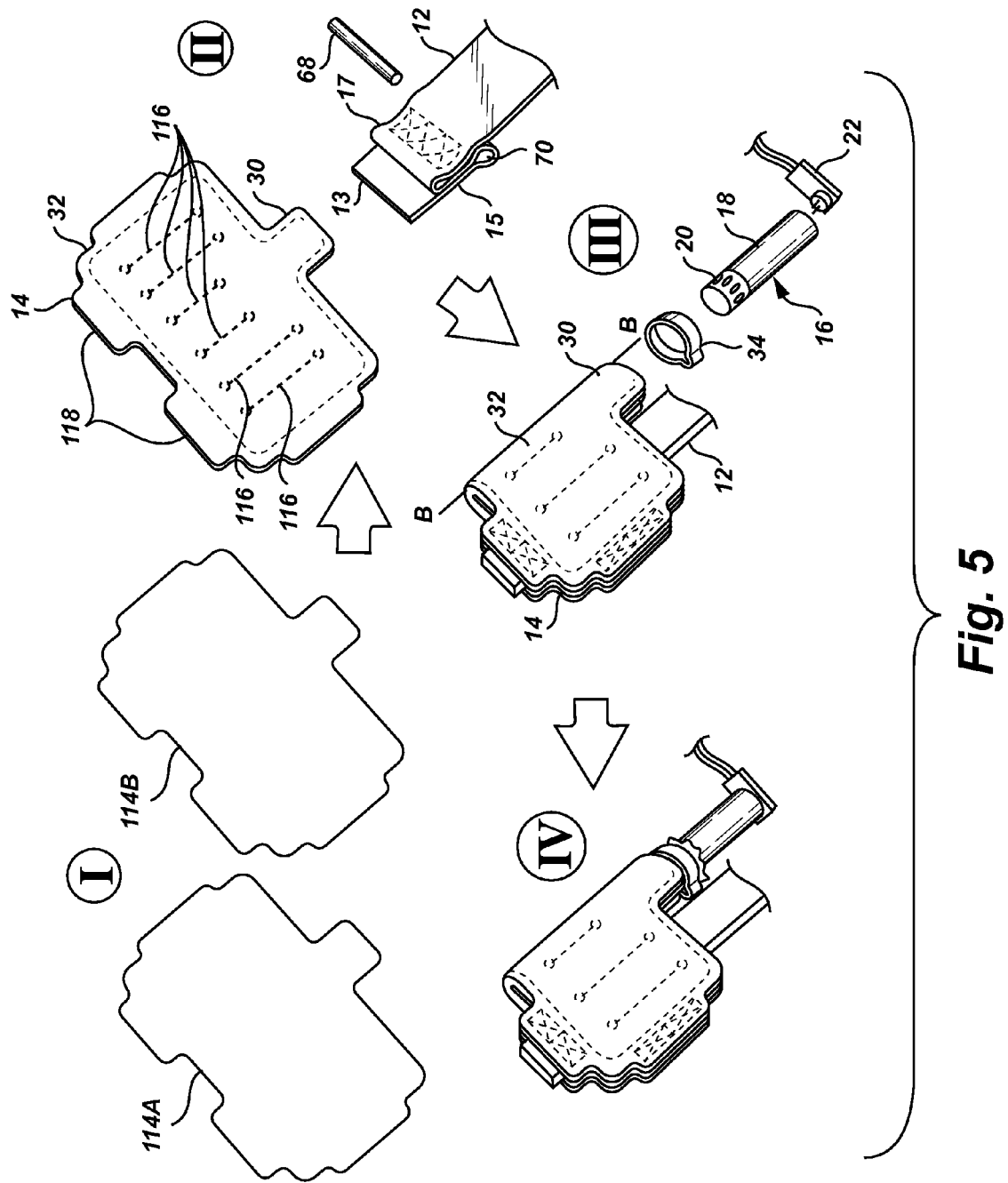

MOTOR VEHICLE SAFETY RESTRAINT SYSTEM

TECHNICAL FIELD

The present invention relates generally to safety restraint systems for occupants of motorized vehicles, and more particularly to seatbelt pretensioner devices and supplemental inflatable restraint systems.

BACKGROUND OF THE INVENTION

A seatbelt assembly is a type of harness system designed to restrain an occupant of an automobile or other motorized vehicle against inadvertent movement that may result, for example, from an abrupt stop or sudden impact with a foreign obstruction. Conventional seatbelt assemblies (also referred to as "safety belts") employ a belt buckle or like element, which is located inboard from the occupant seating position, for engagement with a mating latch plate or fastener, generally provided outboard from the occupant seating position. Engagement of the latch plate with the belt buckle positions a belt strap or webbing across the body of a seated occupant for restraining the occupant against abrupt movement from the seat.

Due to the nature and magnitude of the loads on the safety belt during vehicle impact, the seatbelt assembly has traditionally been mounted directly to the vehicle structure, generally utilizing a three-point attachment configuration. In such arrangements, the belt webbing is normally attached at one end to the vehicle side structure by a belt retractor that is rigidly mounted thereto. The webbing extends upwardly along the vehicle side-structure, passing through a support member, such as a D-ring, mounted near the top of the B-pillar. The strap then extends downward, and is anchored at a second end to the floor pan or side structure adjacent to the retractor.

The latch plate is supported on the belt webbing, adapted to slide between the support-ring and the end of the strap anchored to the vehicle structure. The belt buckle, on the other hand, is conventionally mounted to the vehicle structure, such as the floor pan or tunnel, by a buckle strap which extends through a gap between the bottom cushion and either the middle console or the back cushion of the seat. In a two-point attachment configuration (e.g., wherein a lap belt is provided), the second end of the belt webbing is adjustably secured directly to the latch plate, thereby eliminating the third attachment point.

It is also reasonable to mount portions of the seatbelt assembly directly to the vehicle seat assembly so that the seatbelt anchors maintain a more consistent relationship to the occupant when the seat position is adjusted. By way of example, the seatbelt retractor may be affixed directly to the seat platform (i.e., the base of the seat frame). The strap then extends upwards along the back-frame of the upper seat cushion and passes through a guide or upper support member mounted at the top of the seat frame, adjacent the head rest. The strap then extends downward, and is anchored to the seat frame adjacent to the retractor. With today's seatbelt systems, it is more common to mount the inboard anchor to which the buckle attaches to the seat structure. Many seatbelt implementations also mount the outboard lower anchor to the seat structure. For these implementations, the anchor is typically attached to the portion of the seat structure that moves fore-aft when the seating position is adjusted, but could also be mounted to the portion of the seat frame that moves up-down when the seating position is adjusted.

The seatbelt retractor is intended to increase comfort for the vehicle occupant by allowing the webbing to pay out under relatively low loads, enabling limited movement of the restrained occupant. The retractor is biased to keep the webbing relatively taut about the vehicle occupant, and includes a locking device to lock the retractor against webbing payout at low loads under certain extraordinary conditions. In addition, energy absorbing webbing payout features have been introduced to control the amount of loading that a seatbelt can provide during occupant restraint in an impact, and act to pay out the webbing at predetermined force levels.

In recent years, "pretensioners" have been introduced to actively tighten the seatbelt strap about the vehicle occupant in the event of a sensed triggering condition, such as the onset of an impact event. A pretensioner operates to rapidly draw in a length of webbing, which takes up any slack that may have developed in the belt. Most pretensioners use pyrotechnically generated expanding gas to drive a piston that is attached to the belt webbing. As the piston translates, it pulls the belt webbing, increasing tension around the occupant, in order to maximize the effect of the seatbelt protection and help to more correctly position the vehicle occupant in the seat.

Many vehicles, as part of an overall occupant restraint system, may also include one or more inflatable airbag devices. Inflatable airbag devices, which are now more commonly referred to in the art as Supplementary Restraint Systems (SRS), Air Cushion Restraint Systems (ACRS), or Supplemental Inflatable Restraint Systems (SIR), are originally equipped in almost all present day automotive vehicles. Airbag devices are generally located in the passenger compartment of automotive vehicles, and act as a selectively deployable cushion capable of attenuating occupant kinetic energy. Most airbags are also designed to minimize inadvertent movement of the occupant to eliminate involuntary contact with the interior structure of the automobile.

Traditional airbag devices comprise an inflatable airbag module stored behind the vehicle instrument panel (e.g., for passenger-side airbags), mounted to the steering wheel hub (e.g., for driver-side airbags), or housed within a vehicle seat assembly, side door trim, or headliner trim (e.g., for side-impact airbags). A plurality of sensors or similar devices is strategically located throughout the automobile to detect the onset of a predetermined triggering event. The sensor(s) responsively activates an inflation device, internally located in the airbag module, to produce a flow of inflating gas into an inflatable, relatively unstretchable cushion (i.e., an airbag cushion), also located within the airbag module. The inflating gas causes the airbag cushion to be deployed into the vehicle passenger compartment, toward the vehicle occupant.

SUMMARY OF THE INVENTION

According to one embodiment of the present invention, a safety restraint system for a motorized vehicle is provided. The vehicle has a passenger compartment with a safety belt assembly mounted therein. The safety restraint system includes an inflatable cushion that is adapted to engage with the belt webbing of the safety belt assembly. The cushion is configured to selectively transition from a non-expanded state to an expanded state. An inflation device is in fluid communication with the cushion. Activation of the inflation device operates to transition the cushion from the non-expanded state to the expanded state. Through the aforementioned engagement, the cushion, acting as a pretensioner, retracts a predetermined length of the belt webbing when transitioning from the non-expanded state to the expanded state.

According to one aspect of this particular embodiment, the cushion attaches to a first end of the belt webbing. In this instance, the cushion may also be designed to receive and route the belt webbing therein such that the cushion surrounds a portion of the belt webbing. In addition to or instead of attaching the cushion to the belt webbing, one end of the belt webbing may be wrapped around an outer peripheral surface of the cushion. In this particular instance, the cushion may include one or more belt loops that are attached to the outer peripheral surface of the cushion. The belt loops are configured to mate with and operatively orient the belt webbing.

According to another aspect of this embodiment, the cushion includes at least one shaping element, such as a seam or internal tether, that is configured to limit expansion of the cushion in preselected directions.

In accordance with another aspect of this embodiment, the safety restraint system also includes an anchor plate that is attached to both the inflatable cushion and the inflation device. The anchor plate is configured to attach the inflatable cushion and inflation device to the vehicle.

As part of another aspect, the anchor plate includes a web grabber device. The web grabber device, which is adapted to receive the belt webbing and pass it therethrough, is configured to allow movement of the belt webbing in a first direction, and selectively restrict movement of the belt webbing in a second opposite direction. In one design, the web grabber device includes a movable arm that is configured to engage with and selectively wedge the belt webbing against a stationary portion of the anchor plate when the belt webbing is traveling in the second direction. The web grabber device may include a biasing element, such as a helical coil spring, that is configured to bias the movable arm, and thus the belt webbing, into wedging engagement with the stationary portion of the anchor plate.

In accordance with yet another aspect of this embodiment, the anchor plate includes a shield that at least partially covers and protects the web grabber device. The anchor plate may also include a protrusion that is attached to the shield, projecting outward therefrom toward the web grabber device. The protrusion is configured to press the movable wedging arm, and thus the belt webbing, into wedging engagement with the stationary portion of the anchor plate under a predetermined lateral load.

In yet another aspect, the inflatable cushion is positively attached to the anchor plate.

In accordance with even yet another aspect, the anchor plate includes a guide slot or a guide bar that is configured to receive and operatively route the belt webbing. The belt webbing may be fabricated with an enlarged cross-section portion that is configured to selectively restrict travel of the belt webbing through the slot/guide bar (i.e., in the opposite direction of retraction). The enlarged cross-section portion comprises, for example, a first segment of the belt webbing that is folded back on and fixed to a second segment of the belt webbing, such as by sewing or other mechanical fastening means. In this instance, a dowel pin may be passed through a dowel slot that is formed between the first and second segments of the belt webbing.

In even another aspect of this embodiment, the safety restraint system also includes an outer housing that is attached to the anchor plate or surrounding vehicle structure. The outer housing nests the cushion therein when the cushion is in a non-expanded state. The outer housing includes a tear seam, a closeout door, a material overlap joint, or any combination thereof, that is configured to selectively open such that the cushion can deploy through the outer housing when transitioning from the non-expanded state to the expanded state.

According to another embodiment of the present invention, a safety restraint system is provided for selectively restraining an occupant of a motorized vehicle. The vehicle has a passenger compartment with a seat assembly mounted therein. The safety restraint system includes a seatbelt assembly with a belt webbing that is mounted inside the passenger compartment, proximate to the seat assembly. An inflatable cushion is operatively engaged with a first end of the belt webbing. The cushion is configured to selectively transition from a non-expanded state, in which the cushion is in a stowed condition, to an expanded state, in which the cushion is in an inflated condition. An inflation device, which is operable to release inflation fluid, is in fluid communication with the cushion. Activation of the inflation device operates to transition the cushion from the non-expanded state to the expanded state. Transitioning the inflatable cushion to the expanded state retracts a predetermined length of the belt webbing thereby increasing the tension of the belt webbing.

The above features and advantages, and other features and advantages of the present invention will be readily apparent from the following detailed description of the preferred embodiments and best modes for carrying out the present invention when taken in connection with the accompanying drawings and appended claims.

BRIEF DESCRIPTION OF THE DRAWINGS

FIG. 1A is a perspective view illustration of a safety restraint system in accordance with a preferred embodiment of the present invention, showing the airbag cushion in a non-expanded state and the belt webbing in a non-retracted state;

FIG. 1B shows the airbag cushion and belt webbing of FIG. 1A in an expanded state and a retracted state, respectively;

FIG. 2 is a cross-sectional side-view illustration, in partial cross-section, of the safety restraint system of FIG. 1A;

FIG. 3 is an exploded perspective view illustration of a safety restraint system anchor plate in accordance with one embodiment of the present invention;

FIG. 4 is a perspective view illustration of a safety restraint system anchor plate in accordance with another embodiment of the present invention;

FIG. 5 is an exploded, perspective view illustration showing a method of assembling the safety restraint system of FIGS. 1A and 1B;

DESCRIPTION OF THE PREFERRED EMBODIMENTS

Figure 7:
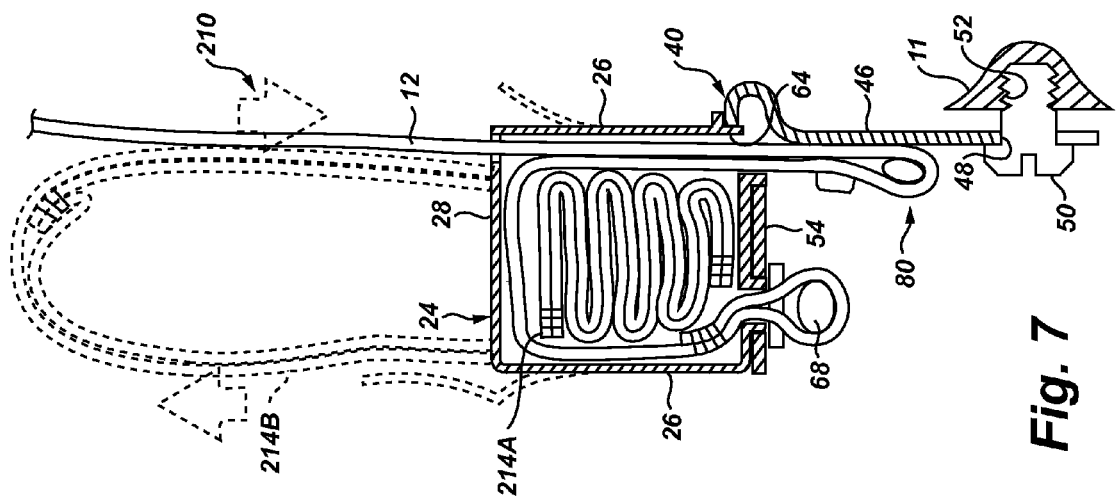
FIG. 7 is a cross-sectional side-view illustration, in partial cross-section, of the safety restraint system of FIG. 6.

Referring to the drawings, wherein like reference numbers refer to like components throughout the several views, there is shown in FIG. 1A a motor vehicle safety restraint system, designated generally at 10, in accordance with one embodiment of the present invention. The drawings presented herein are not to scale—the dimensions and relative orientation of the constituent components shown throughout the drawings are intentionally exaggerated for clarity and a better understanding of the present invention. Thus, the individual and relative dimensions and orientations shown in the drawings are not to be considered limiting. In addition, the present invention will be described herein in the context of a standard passenger vehicle. However, the present invention may just as easily be incorporated into any motorized vehicle platform. Finally, it should be readily appreciated that the adjectives used to specify spatial relationships, such as inboard, outboard, forward, rearward, horizontal, vertical, upper, lower, etc., indicate spatial relationships as they exist with respect to their intended orientations relative to an automobile when operatively oriented therein. Nevertheless, the spatial relationships specified may be varied within the scope of the claims appended hereto.

The safety restraint system 10, as noted above, is intended to be mounted inside of a conventional motorized vehicle, such as a modern-day automobile, which is represented in FIG. 2, by vehicle structure 11. The safety restraint system 10 is preferably attached to a conventional vehicle seat assembly (e.g., wherein vehicle structure 11 is a portion of the seat assembly support frame), but could also be located laterally outboard from a vehicle seat assembly (e.g., wherein vehicle structure 11 is a lower portion of a B- or C-pillar structure), inside of the vehicle passenger compartment.

A safety belt assembly (also referred to herein as "seatbelt assembly"), represented in FIGS. 1A and 1B of the drawings by a length of retractable seatbelt webbing 12, is also mounted inside the passenger compartment, preferably in a conventional three-point attachment configuration. The belt webbing 12 is retractably mounted directly to a respective seat assembly. Alternatively, the belt webbing 12 may be mounted directly to the vehicle structure, such as the floor pan or a corresponding pillar structure. It is also possible, within the scope of the present invention, that safety belt mountings at the anchor locations, retractor location(s), D-ring location, and buckle mounting point location be intermixed among seat and floor attachments. A latch plate (not shown) is preferably slidably supported by the belt webbing 12.

The safety restraint system 10 includes an inflatable cushion 14 and an inflation fluid dispensing device 16 (or "inflator" for short). In the exemplary embodiment of FIGS. 1A and 1B, the inflator 16 has a generally cylindrical body 18, which acts as a pressure vessel portion used to store inflation gas. Discharge ports 20, which are best seen in FIG. 5, are located at one end of the cylindrical inflator body 18 such that they are remote from an opposing, second end having an electrical terminal 22 adapted to receive an activation signal. Alternatively the electrical terminal 22 can be located near the discharge ports 20.

In the embodiment of FIGS. 1A and 1B, the cushion 14 arrangement is divided into two primary portions: a sleeve portion 30 and an expansion portion 32. The sleeve portion 30 is designed like a sheath. Specifically, the sleeve portion 30 has a generally cylindrical configuration, and is open at one end thereof. The open end of the sleeve portion 30 is passed over the discharge port 20 of the inflator 16, and pushed down the shaft of the cylindrical body 18. An annular band clamp 34 securely attaches the inflatable cushion 14 to the inflator 16, and also functions to fluidly seal the sleeve portion 30 about the outer perimeter of the cylindrical body 18. It is in this manner that the sleeve portion 30 acts to fluidly couple the cushion 14 to the inflator 16. With that said, the inflator 16 may be packaged in a remote location relative to the cushion 14, and the two members fluidly coupled through a fill tube or other fluid conduit, without departing from the intended scope of the present invention. Moreover, the inflator 16 could be packaged completely within the cushion 14 with the wiring for the electrical terminal 22 extending out of the cushion, without departing from the intended scope of the present invention.

The inflator 16 acts as a pyrotechnic device, used to generate or store and discharge inflation gas. That is, the inflator 16 is selectively actuable to dispense a fluid, preferably in the nature of a pressurized gas, such as nitrogen, argon, or carbon dioxide. In doing so, the inflator 16 is selectively operable to rapidly transition the inflatable cushion 14 from a non-expanded state (exemplified in FIG. 1A) to an expanded state (seen in FIG. 1B). For example, the inflatable cushion 14 is shown in a non-expanded, stowable state 14A in FIG. 2, wherein the inflatable cushion 14 is contained within an outer housing 24 in a deflated and folded condition. Upon activation of the inflator 16 (e.g., via a triggering signal sent to electrical terminal 22 by an on-board vehicle controller), inflation gas is discharged from the discharge port 20 into the cushion sleeve portion 30. As inflation gas is forced through the sleeve portion 30, pressure increases inside of the expansion portion 32, inflating the cushion 14. As the cushion 14 inflates, it pushes against the outer and upper walls 26 and 28, respectively, of the outer housing 24.

According to the embodiment of FIG. 1A, the outer housing 24 includes a frangible tear seam, indicated at 36 with hidden lines in FIG. 1A. The representative tear seam 36 is defined by a plurality of indentations or slots that weaken the outer housing 24 at preselected locations. When the inflatable cushion 14 is expanded with sufficient force, the cushion expansion portion 32 will break the tear seam 36, and push or press through the outer housing 24 to a second, expanded state 14B in which the cushion 14 is substantially outside the outer housing 24, positioned between a vehicle occupant and a portion of the vehicle interior structure, as seen in FIGS. 1B and 2.

Although the outer housing 24 is shown in FIG. 1A with a tear seam 34 for releasing the air bag cushion 14, the outer housing 24 can be designed with a deployment door, shown schematically with phantom lines 38 in FIG. 1A, or in a "burping" configuration with respect to an adjacent component (not shown) to allow for deployment of the cushion 14 between the deployment door and the adjacent component. In addition, or as an alternative to the outer housing 24, the entire safety restraint system 10 may be stowed and concealed behind an interior side-trim panel that is engineered to allow for the operative release of the cushion 14. Finally, the safety restraint system 10 could be fabricated with guidance features (not shown) for the cushion 14, such as a chute made of plastic, metal or fabric to guide it to the deployment door or trim panel surface from which it exits during deployment. The guidance features may be stationary in nature, or could expand in a telescoping manner (e.g., like bellows) if the deployment door or trim panel surface through which the cushion 14 exits moves relative to the safety restraint system 10, such as in an up-down direction as the seat is adjusted by the occupant. These guidance features could be mounted to the safety restraint system 10, a trim panel, an adjacent component, or some combination thereof.

In accordance with the present invention, the inflatable cushion 14 is adapted to engage with the belt webbing 12 of the safety belt assembly and, through this operative interplay, the cushion 14, acting as a pretensioner, retracts a predetermined length of the belt webbing 12 when transitioning from the non-expanded state 14A, FIG. 1, to the expanded state 14B, FIG. 1B. In the embodiment of FIGS. 1A and 1B, a first end 13 (FIG. 1B) of the belt webbing 12 is positively attached to the airbag cushion 14. For example, the belt webbing 12 may be stitched to an upper extent of the cushion 14, as seen in FIG. 1B, although other conventional means may also be employed to fasten the webbing 12 to the cushion 14. Inflation of the cushion 14 as described above will thereby draw or pull a portion of the webbing 12 into the outer housing 24 and, in so doing, retract a predetermined length of the belt webbing 12 (represented schematically in FIG. 1B by arrow A), which increases the tension of the belt webbing 12. The particular design of this invention eliminates the need for a separate pretensioner device, offering cost savings and increased freedom in design and packing of the vehicle interior. A gross mass savings and, thus, increased fuel economy may also be realized.

The webbing 12, cushion 14 and inflator 16 are interconnected by an anchor plate, indicated generally throughout the drawings at 40, which is configured to attach the safety restraint system 10 to the vehicle structure 11. In the exemplary configuration illustrated in FIGS. 1A-3, the anchor plate 40 includes a partially cylindrical, elongated channel portion 42 that is shaped and dimensioned to nestably receive, support, and retain the inflator 16. The channel portion 42 may be fabricated with an internal diameter that is substantially equivalent to, or slightly larger than the outer diameter of the inflator's cylindrical body 18. The inflator 16 may be slid or fed into the channel portion 42, and retained therein by fasteners (not shown) or other mechanical attaching means. Alternatively, the channel portion 42 may be clamped or closed around the inflator's cylindrical body 18.

The channel portion 42 is attached to a generally planar interface portion 46 via an intermediate, generally planar flange portion 44. The interface portion 46 is engineered to attach the entire safety restraint system 10 to the vehicle structure 11. For example, the interface portion 46 defines a fastener hole 48 through a lower end thereof. The fastener hole 48 is shaped and dimensioned to receive a complementary fastening element, such as bolt 50 (FIG. 2). By feeding the bolt 50 through the fastener hole 48, and threadably mating the bolt 50 with a complementary threaded hole 52 that is integrated with (i.e., attached to or formed in) the vehicle structure 11, the anchor plate 40 is secured to the vehicle structure 11. It should be recognized that alternative means of connecting the anchor plate 40, and thus the safety restraint system 10, to the vehicle structure 11 may be used within the scope of the appended claims.

A generally flat platform portion 54, which is most clearly illustrated in FIG. 3, extends generally orthogonally from an upper end of the anchor plate interface portion 46. The platform portion 54 includes first and second generally parallel, elongated guide slots, respectively indicated at 56 and 58. The outer housing 24 is attached at a lower end thereof to the anchor plate platform portion 54. By way of example, and not limitation, a lower wall 29 of the outer housing 24 includes a reduced section tongue portion 60 that is received in, and snap-fit into engagement with the second guide slot 58 formed through the platform portion 54. An optional set of mounting studs 61 and a corresponding mounting plate 63 may also be employed to positively attach the airbag cushion 14 the outer housing 24, and fasten the cushion 14 and outer housing 24 to the platform portion 54, as seen in FIG. 2. Evidently, other means of connecting the cushion 14 and outer housing 24 to the anchor plate 40 may be used without departing from the intended scope of the present invention.

With continuing reference to FIG. 2, the belt webbing 12 is threaded or laced through a first elongated receiving slot 62 that is longitudinally oriented along and formed through the upper wall 28 of the outer housing 24. The webbing 12 passes down through the outer housing 24, proximate and generally parallel to an outer side-wall 26, as seen in FIG. 2. The belt webbing 12 transitions out of the outer housing 24 through a second elongated receiving slot 64 that is longitudinally oriented along and formed through the lower wall 29, and is aligned with the first guide slot 56. The belt webbing 12 is then fed through a web grabber device, indicated generally by reference numeral 80, which, in the exemplary embodiment of FIGS. 1A-3, projects outward from the interface portion 46 of the anchor plate 40. The webbing 12 is then threaded up through a hollowed center, or third guide slot 66, of the reduced section tongue portion 60, which is aligned and engaged with the second guide slot 58, as described hereinabove. An end portion of the belt webbing 12, which is proximate to the first end 13 thereof, routes through the middle of the inflatable cushion 14 so that the cushion material surrounds a portion of the belt webbing 12. The first end 13 is then attached to the cushion 14, as described above.

The belt webbing 12 may be fabricated with an enlarged cross-section portion that is configured to restrict the belt webbing from traveling back through the guide slot 66 (i.e., in the opposite direction of retraction). Purely by way of example, the enlarged cross-section portion may consist of a first segment 15 of the belt webbing 12 that is folded back on and fixed to a second segment 17 of the belt webbing 12, such as by sewing or other mechanical fastening means. The girth of the enlarged cross-section portion should be larger than the cross-section area of the third guide slot 66 such that any attempt to prematurely or inadvertently pull the first end 13 of the belt webbing 12 through the third guide slot 66 is obstructed by the enlarged cross-section portion. Additional resistance may be realized by including an optional dowel pin 68 that is passed through and retained in a dowel slot 70, which is formed between the first and second segments 15, 17 of the belt webbing 12. The length of the dowel pin 68 should be larger than the width of the third guide slot 66 such that any attempt to prematurely or inadvertently pull the first end 13 of the belt webbing 12 through the third guide slot 66 is hindered by the dowel pin 68 engaging the inner surface of the lower wall 29.

The web grabber device 80 is configured to allow movement of the belt webbing 12 in a first direction—i.e., the direction of retraction indicated by arrows A, and selectively restrict movement of the belt webbing 12 in a second direction that is opposite of the first. In the embodiment of FIGS. 1A and 1B, the web grabber device 80 includes a housing or frame, which is collectively defined by the intermediate flange portion 44, the anchor plate interface portion 46, an extrusion portion 72, which extends generally orthogonally from the interface portion 46 in parallel opposing relation to the flange portion 44, and a shield 74 that is attached to the anchor plate 40. A movable arm 82 is slidably disposed at opposing ends thereof in a pair of longitudinally offset, complimentary apertures 84 and 86. The apertures 84, 86 are respectively formed in and vertically elongated along the extrusion portion 72 and flange portion 44 of the anchor plate 40. The movable arm 82 is thereby configured to selectively move up and down, with respect to the views provided in FIGS. 1A-3, along the anchor plate 40.

Alternatively, it should be understood that the movable arm 82 may be hinged to the anchor plate 40, to pivot or rotate into wedging engagement with the belt webbing 12. The belt webbing 12 is wound around a portion of the outer periphery of the movable arm 82, as seen in FIG. 2, and then is interleaved between the movable arm 82 and a stationary arm 88 (also referred to herein as "stationary portion"), which is rigidly secured at opposing ends thereof to the anchor plate 40, namely flange portion 44 and extrusion portion 72. For a pivoting/rotating wedge engagement concept, the moveable arm 82 would be configured to have a mechanical advantage (e.g., a lever), and would rotate when an occupant pulls on the belt webbing 12 causing it to engage and compress the webbing 12 between the moveable arm 82 and an adjacent structure, thus locking its movement in a direction toward the occupant being restrained. Note that several types of web grabbers in cinching latch plates utilize rotational or a translational functionality as described herein to lock the seatbelt webbing during loading. All such designs are understood to be directly applicable to this concept within the scope of this invention.

When the movable arm 82 is distanced or spaced from the stationary arm 88, the safety-belt webbing 12 may pass freely through the web grabber device 80. However, reverse travel of the webbing 12 (i.e., movement in a direction opposite of retraction) in excess of a predetermined limit will cause the movable arm 82 to slide upwards within the apertures 84, 86, and wedge the belt webbing 12 against the stationary arm 88. The web grabber device 80 thus enables the webbing to be pulled in one direction by the deploying cushion 14, and prevents any further webbing 12 being paid out when the seatbelt is pulled by the occupant. The web grabber device 80 may include a biasing element, represented herein by first and second helical coil springs, respectively indicated at 90 and 92 in FIG. 3, which biases the movable arm 82, and thus the belt webbing 12, into wedging engagement with the stationary arm 88. A spring loaded engagement element (not shown) that engages the seatbelt webbing 12, between the airbag cushion 14 and web grabber device 80, may be employed to introduce a small amount of slack in this portion of the seatbelt assembly. In this manner, the cushion 14 may not be significantly pulled prior to the web grabber 80 engaging, which may be of benefit in both deployment and non-deployment loading conditions.

An optional leverage adjustment feature, designated 94 in FIG. 3, may also be incorporated into the web grabber device 80. The leverage adjustment feature 94 acts as a stationary reaction surface for the seatbelt webbing 12, facilitating retraction of the webbing 12 by the deploying cushion 14 through its routing by the web grabber 80. The leverage adjustment feature 94 adjusts the geometry of the webbing as it is being pulled through the web grabber 80 by the deploying cushion 14 to enable an appropriate level of geometric leverage (i.e., a reduction in geometric leverage) relative to the web grabber 80 to minimize any potential jamming of the belt webbing 12 in the web grabber 80.

The shield 74 at least partially covers and protects the web grabber device 80, for example, in the event of a side impact that may otherwise result in the web grabber 80 being crushed under the impending lateral load. In the embodiment of FIG. 3, the shield 74 is attached to the anchor plate 40 through the press-fit engagement between a clamp segment 75, which has an array of fingers that interface with and pinch against the anchor plate extrusion portion 72, and the interlocking, snap-fit engagement between a snap-fastener segment 77 and a complementary slot 43, which is formed in the anchor plate 40, in between the channel portion 42 and flange portion 44. This forms a box-like structure that can resist any impending lateral load.

A generally square aperture 79 is formed through the center of the shield 74, to receive a finger 96 (also referred to herein as "protrusion"). According to the representative configuration illustrated in FIG. 2, the finger 96 operatively locks to the shield 74 via the interplay between a plurality of stubs 95 which press against one side of the shield 74, and the mating engagement between a snap feature 97 and the opposing side of the shield 74. Alternatively, the finger 96 may be integrally formed with the shield 74, or attached thereto by alternate mechanical fastening means. To this regard, the shape, dimensions, orientation and location of the finger 96 may be varied to tailor to the specific needs of the intended application of the safety restraint system 10. As seen in FIG. 2, the finger 96 projects outward from the shield 74 toward the web grabber device 80. The finger 96 is configured to press the movable wedging arm 82, and thus the belt webbing 12, into wedging engagement with the stationary arm 88 under a predetermined lateral load. For example, under a predetermined load, the stubs 95 will break, and the finger 96 will be pressed or urged into the movable arm 82, which in turn will be forced upward into engagement with the stationary arm 88 along a sloped surface 99 of the snap feature 97.

FIG. 4 provides a perspective view illustration of an alternative anchor plate configuration in accordance with the present invention. The anchor plate of FIG. 4, designated generally at 140, is substantially identical to the anchor plate 40 described above with respect to FIGS. 1A-3. The primary distinction is the configuration of the anchor plate interface portion. In the embodiment of FIG. 4, the interface portion 146 includes a guide bar 148 that reroutes the belt webbing 12 to the web grabber device 80, which has an angled orientation with respect to the guide bar 148. Another distinction shown in FIG. 4 is an optional external spring element 151 that attaches the anchor plate 140 to vehicle structure 11. This spring element 151 is configured to optimally position/reposition the safety restraint system 110 relative to the vehicle structure, and/or mitigate any rattling. For instance, the spring element 115 may help hold the safety restraint system in one orientation when the seatbelt is not worn to help with entry into or egress from the seat. The spring element 115 can take many forms and be attached to any portion of the safety restraint system 110.

Turning now to FIG. 5, one proposed method of assembling a portion of the safety restraint system 10 is illustrated therein. By no means is the fabrication and assembly of the safety restraint systems of the present invention limited to the example provided in FIG. 5. Rather, this is one manner in which the inflatable cushion 14 may be fabricated, subsequently attached to the belt webbing 12, and then operatively connected to the inflator 16. In step one, an inboard (or inside) panel, labeled 114A, is sewn to an identical outboard (or outside) panel, labeled 114B in FIG. 5. The inboard and outboard panels 114A, 114B are stitched along the outer contours thereof to create a gas pocket for inflation fluid. Ideally, the cushion 14 is manufactured to include a shaping element, such as the array of parallel seam lines 116 seen in FIG. 5, that limit lateral expansion of the cushion within the occupant compartment of the vehicle. In step two, the webbing's enlarged cross-section portion is formed as described above—a first segment 15 of the belt webbing 12 is folded back on and sewn to a second segment 17 of the belt webbing 12. The dowel pin 68 is thereafter pressed into the dowel slot 70, which is formed between the first and second segments 15, 17 of the belt webbing 12. The belt webbing 12 is then laid along one side of the deflated cushion 14 such that the first end 13 of the webbing 12 lies against one of the upper extension portions 118 projecting from the upper edge of the cushion 14. The cushion 14 is then folded in half along a vertical folding line B-B, such that the extension portions 118 overlap. Subsequently, the extension portions 118 and belt webbing 12 are sewn together. In addition, lateral end portions 120, which project outward from opposing lateral edges of the cushion 14, are sewn together as well. The inboard and outboard panels 114A, 114B can be reconfigured to include an extension portion, shown with hidden lines in FIG. 1B at 33, that protrudes outward when the cushion 14 is inflated.

In step three, the open end of the sleeve portion 30 is passed over the discharge port 20 of the inflator 16, and pushed down the shaft of the cylindrical body 18. The annular band clamp 34 is then crimped around the sleeve portion 30 and inflator body 18, attaching the cushion 14 to the inflator 16, and fluidly sealing the sleeve portion 30 about the outer perimeter of the cylindrical body 18. The resultant cushion-webbing-inflator subassembly is depicted in step four.

Figure 6:
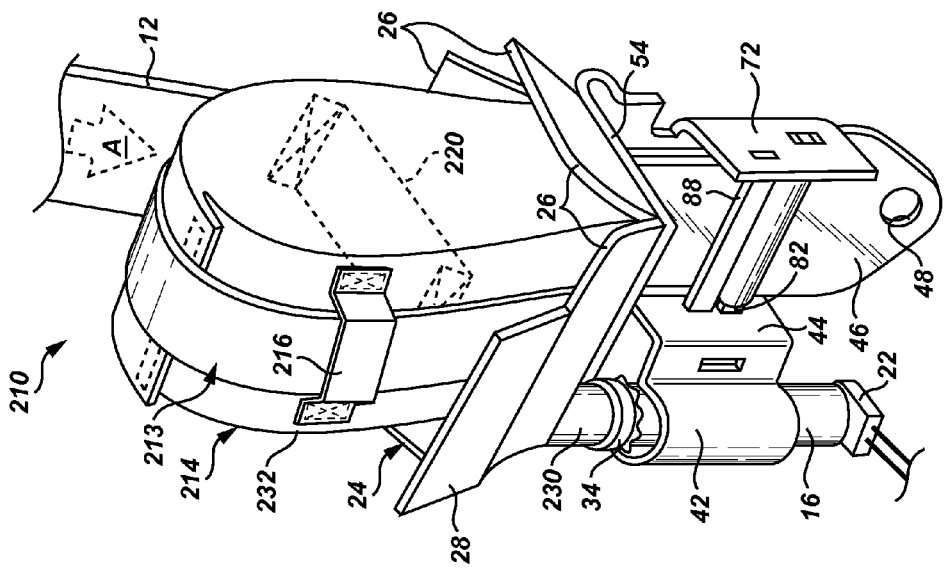
FIG. 6 is a perspective view illustration of a safety restraint system in accordance with another preferred embodiment of the present invention, showing the airbag cushion in an expanded state and the belt webbing in a retracted state.

FIGS. 6 and 7 illustrate a safety restraint system in accordance with another preferred embodiment of the present invention. As noted hereinabove, like reference numerals are used in FIGS. 6-7 to indicate similar structure from FIGS. 1A-1B. The safety restraint system 210 is substantially identical in function to the embodiment shown in FIGS. 1A-1B. The primary distinction of the embodiment shown in FIGS. 6 and 7 is the manner in which the inflatable cushion engages with the belt webbing, and thereby operates to retract a portion of the webbing when the cushion is inflated. Specifically, in addition to or instead of attaching the cushion to the belt webbing, as described hereinabove, an end section of the belt webbing, indicated generally at 213 in FIG. 6, is wrapped around an outer peripheral surface of the cushion 214. The cushion 214 includes an optional array of belt loops (one of which is visible in FIG. 6, and labeled 216) that are attached to the outer peripheral surface of the cushion 214. The belt webbing end section 213 is fed through each belt loop 216, which acts to operatively orient the belt webbing 12 during retraction thereof, and provides a means for positively securing the belt webbing 12 to the cushion 214.

The inflatable cushion 214 is shown in a non-expanded, stowable state 214A in FIG. 7, wherein the cushion 214 is inside the outer housing 24 in a deflated and folded condition. Upon activation of the inflator 16 (e.g., via a triggering signal sent to electrical terminal 22 by an on-board vehicle controller), inflation gas is discharged from the discharge port 20 into the cushion sleeve portion 230. As inflation gas is forced through the sleeve portion 230, pressure increases inside of the expansion portion 232, inflating the cushion 214. As the cushion 14 inflates, it pushes against the outer and upper walls 26 and 28, respectively, of the outer housing 24. When the inflatable cushion 214 is expanded with sufficient force, the expansion portion 232 will break the tear seam 36 in the outer housing 24 (FIG. 1A), and push or press through the outer housing 24 to a second, expanded state 214B in which the cushion 214 is substantially outside the outer housing 24, positioned between a vehicle occupant and a portion of the vehicle interior structure, as seen in FIG. 7. Similar to the embodiment shown in FIGS. 1A and 1B, the cushion 214 of FIG. 6 includes at least one shaping element. In this particular instance, the shaping element comprises an internal tether, shown hidden in FIG. 6 at 220, that limits expansion of the cushion 214 in preselected directions.

Inflation of the cushion 214 as described above will thereby draw or pull a portion of the webbing 12 through the anchor plate 40 and web grabber device 80, and out of the outer housing 24. In so doing, the cushion 214 retracts a predetermined length of the belt webbing 12 (represented schematically in FIG. 7 by arrow A), which increases the tension of the belt webbing 12. In the configuration shown in FIGS. 6 and 7, the amount of webbing 12 that is retracted by the cushion 14 is approximately twice the length that the cushion 14 moves in an upward direction during deployment. It is also possible to wrap the webbing 12 around the entire perimeter of the cushion 14 to obtain a larger ratio of webbing-to-cushion movement. As another alternative, the cushion could also be configured in a donut shape with a filled portion that surrounds the webbing routing as it wraps around an upper surface of the cushion.

While the best modes for carrying out the present invention have been described in detail herein, those familiar with the art to which this invention pertains will recognize various alternative designs and embodiments for practicing the invention within the scope of the appended claims. For instance, the cushion could have numerous outer panel shapes, vent configurations, reinforcement panels, shaping tethers, and internal chambers to help control its deployment trajectory and restraint capacity. The cushion and/or entire restraint system could also be packaged in a wrap, likely made from fabric, or a boxlike structure, likely made of plastic, to retain it prior to deployment. These containers could be integral to or separate from the restraint system or the surrounding interfacing components, such as a trim panel.

The structure for the device could also be shaped in numerous other configurations. For example, the structure could be shaped/configured so that the seatbelt webbing does not pass through it before it reaches the web grabber device, either as it routes from the occupant to the web grabber, or as it routes from the cushion to the web grabber device. In addition, the web grabber structure, its corresponding reaction surface, or the device structure could be all or partially molded out of plastic. Portions of the web grabber, such as the moveable arm, can have teeth or other features to help it grab the webbing.

The moveable arm for the web grabber could also be located adjacent the seatbelt routing, and be a spring-loaded, translating wedge that moves relative to and pushes off of a structural reaction surface. The wedge pushes into the webbing, trapping it against another reaction surface adjacent thereto so that the spring is the only element that pushes the wedge into engagement with the seatbelt. The moveable arm for the web grabber could also be a rotational arm that is structurally attached, and is spring loaded to engage the seatbelt and press it against an adjacent structural reaction surface so that the spring is the only element that pushes the wedge into engagement with the seatbelt.

Finally, within the scope of this invention, the web grabber device could consist of a mechanism like is found on seatbelt retractor mounted web grabbers where the movement of a portion of the device, in this case, the element that changes routing direction of the seatbelt webbing, pushes on a mechanism during seatbelt loading that either rotates or translates one or more moveable arms or wedges into an engaging/wedging relationship with the seatbelt and potentially adjacent structure so that the seatbelt webbing can move in one direction but not in the opposite direction.

The invention claimed is:

1. A safety restraint system for a motorized vehicle having a passenger compartment with a safety belt assembly operatively mounted therein, the safety belt assembly having a belt webbing, the safety restraint system comprising:
    an inflatable cushion adapted to engage with the belt webbing, said cushion configured to selectively transition from a non-expanded state to an expanded state;
    wherein said cushion is adapted to attach to a first end portion of the belt webbing;
    wherein said cushion is configured to receive therein and surround a first end portion of the belt webbing; and
    an inflation device in fluid communication with said cushion, wherein activation of said inflation device operates to transition said cushion from said non-expanded state to said expanded state;

wherein said cushion contacts the belt webbing when transitioning from said non-expanded state to said expanded state thereby retracting a predetermined length of the belt webbing.

2. The safety restraint system of claim 1, wherein said cushion includes at least one shaping element configured to limit expansion of said cushion in preselected directions.

3. The safety restraint system of claim 1, further comprising:
a web grabber device adapted to receive the belt webbing and configured to allow movement of the belt webbing in a first direction and selectively restrict movement of the belt webbing in a second opposite direction.

4. The safety restraint system of claim 3, further comprising:
an outer housing operatively attached to said anchor plate, said outer housing nesting said cushion therein when in said non-expanded state.

5. The safety restraint system of claim 4, wherein said outer housing includes at least one of a tear seam, a closeout door, and a material overlap joint configured to selectively open such that said cushion can deploy through said outer housing when transitioning from said non-expanded state to said expanded state.

6. The safety restraint system of claim 3, wherein said web grabber device includes a movable arm configured to engage with and selectively wedge the belt webbing against a stationary portion thereof when the belt webbing is traveling in said second direction.

7. The safety restraint system of claim 6, wherein said web grabber device further includes a biasing element configured to bias said movable arm into wedging engagement with said stationary portion.

8. The safety restraint system of claim 6, further comprising:
a shield at least partially covering said web grabber device.

9. The safety restraint system of claim 6, further comprising:
a protrusion configured to press said movable wedging arm into wedging engagement with said stationary portion under a predetermined lateral load.

10. The safety restraint system of claim 1, further comprising:
an anchor plate operatively attached to said inflatable cushion and inflation device and configured to attach the same to the vehicle.

11. The safety restraint system of claim 10, wherein said cushion is positively attached to said anchor plate.

12. The safety restraint system of claim 10, further comprising:
a biasing member attached to and disposed between said anchor plate and the structure of the vehicle, said biasing member configured to selectively orient the safety restraint system relative to the vehicle structure.

13. The safety restraint system of claim 10, further comprising:
a leverage adjustment feature operatively attached to said anchor plate and configured to adjust the geometry of the webbing as it is being pulled therethrough.

14. The safety restraint system of claim 10, wherein said anchor plate includes at least one of a guide slot and a guide bar configured to receive and route the belt webbing.

15. The safety restraint system of claim 14, wherein the belt webbing includes an enlarged portion configured to selectively restrict travel of the belt webbing through said at least one slot and guide bar.

16. A safety restraint system for a motorized vehicle having a passenger compartment with a safety belt assembly mounted therein, the safety belt assembly having a belt webbing, the safety restraint system comprising:
an inflatable cushion operatively engaged with the belt webbing, said cushion configured to selectively transition from a non-expanded state to an expanded state; and
wherein a first end portion of the belt webbing wraps around an outer peripheral surface of said cushion;
an inflation device in fluid communication with said cushion and operable to release inflation fluid, wherein activation of said inflation device operates to transition said cushion from said non-expanded state to said expanded state;
wherein said cushion contacts the belt webbing when transitioning from said non-expanded state to said expanded state thereby retracting a predetermined length of the belt webbing; and,
wherein said cushion includes at least one belt loop attached to said outer peripheral surface, wherein said at least one belt loop is configured to mate with and operatively orient the belt webbing.

* * * * *